United States Patent

[11] 3,618,601

[72] Inventor Thatcher W. Richardson
 5345 Bevedere, Indianapolis, Ind. 46208
[21] Appl. No. 867,003
[22] Filed Oct. 16, 1969
[45] Patented Nov. 9, 1971

[54] IONTOPHORESIS UNIT
 6 Claims, 4 Drawing Figs.

[52] U.S. Cl. ................................................ 128/172.1,
 204/223, 307/43
[51] Int. Cl. ........................................................ A61n 1/30
[50] Field of Search .......................................... 128/172.1,
 419, 420, 2.1

[56] References Cited
UNITED STATES PATENTS
2,716,979 9/1955 Pouret .......................... 128/2.1 R
3,364,929 1/1968 Ide et al. ........................ 128/172.1

FOREIGN PATENTS
1,126,634 9/1968 Great Britain ................ 128/2.1

Primary Examiner—Richard A. Gaudet
Assistant Examiner—G. F. Dunne
Attorney—Hood, Gust, Irish, Lundy & Coffey ABSTRACT: An iontophoresis unit comprising means for probing into a biological medium, the probing means providing a resistance load, a high-voltage source, a low-voltage, calibrated current source, and an amplifier. The amplifier includes an output junction and a summing junction between which the probe means is connected, first circuit means for connecting the summing junction to one side of the low-voltage source and second circuit means for connecting the output junction to one side of the high-voltage source.

PATENTED NOV 9 1971
3,618,601
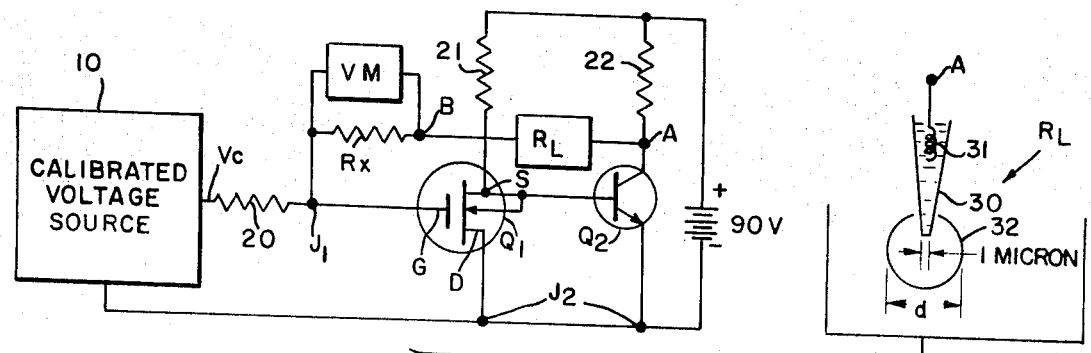
Fig. 1
Fig. 2
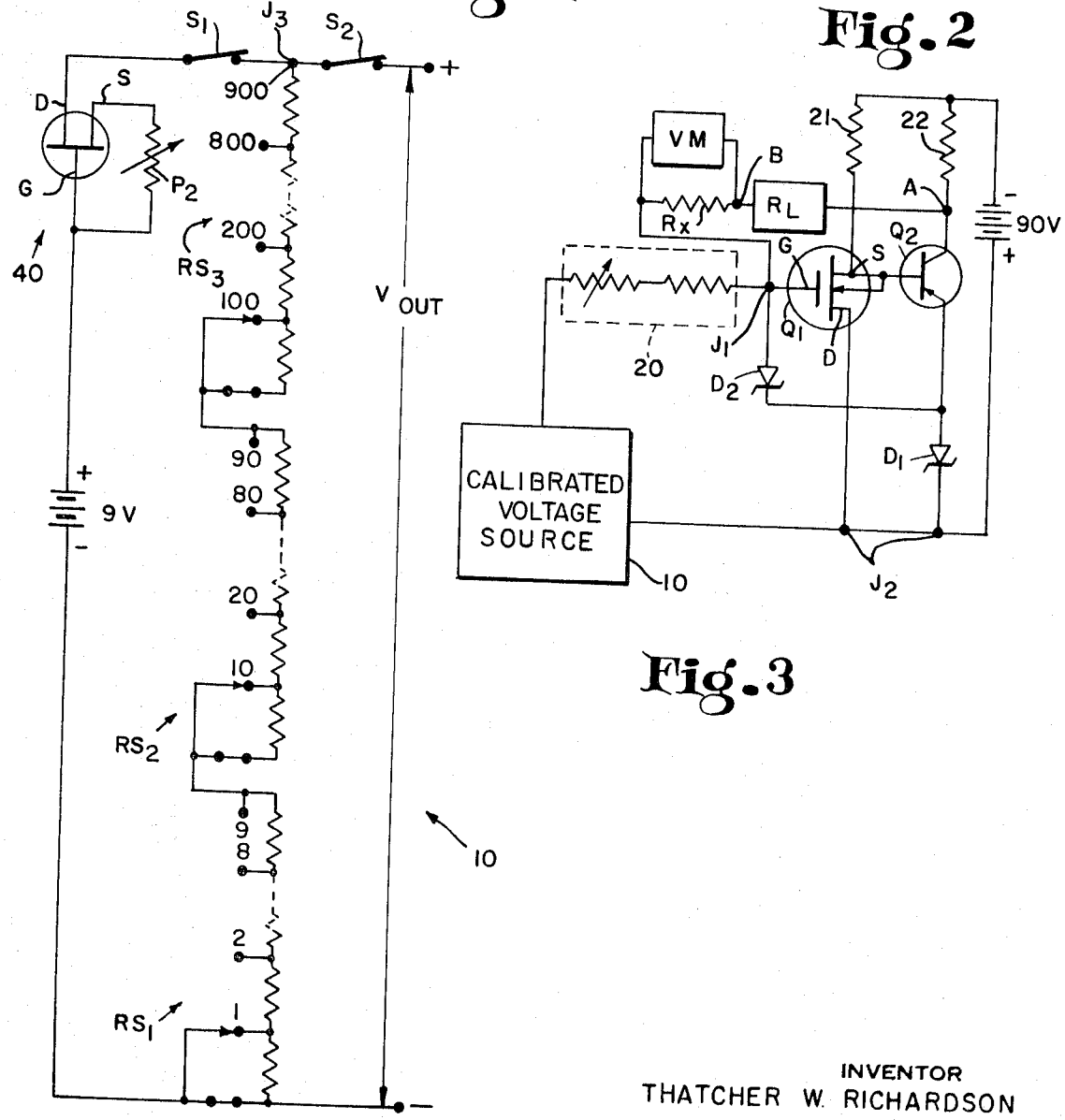
Fig. 3
Fig. 4
INVENTOR
THATCHER W. RICHARDSON
BY
Hood, Gust, Irish & Lundy
ATTORNEYS

IONTOPHORESIS UNIT

It is a primary object of my invention to provide an iontophoresis unit which will apply a linearly controlled current to a microelectrode which is inserted into a biological medium, such as a nerve cell. My iontophoresis unit may be used to stimulate a biological medium, such as a nerve cell, in either one of two ways. First, my device may be used to deposit, in a controlled manner, a drug into the cell which drug excites or inhibits the cell. Secondly, my device may be used, in a controlled manner, to change the electrical potential inside the cell. In other words, my device may be used electrically to spray a drug into a cell or electrically to stimulate, i.e., to change the electrical potential of, the cell.

My device is an improvement over present devices in that it will apply a linearly controlled current of a preselected value to a microelectrode which is inserted into a cell. Present devices are arranged so that the current is established by monitoring the output from the iontophoresis device and adjusting the device, i.e., a knob on the device, until the monitoring meter reads the proper value. My device will permit this proper value to be set automatically. ONce my device is calibrated, further adjustments are not necessary other than dialing the desired current output on a digital dial. The dial readings will correspond to the values of applied current.

Thus, an advantageous feature of my device is that it includes a current source which is selectively and linearly adjustable to provide the desired amount of current.

My preferred iontophoresis unit comprises means for probing into a biological medium, the probing means proving a resistance load, a high voltage source, a low voltage, calibrated current source, and an amplifier. My amplifier, which may best be described as a half-operational amplifier, includes an output junction and a summing junction between which the probe means is connected, first circuit means for connecting the summing junction to one side of the low voltage source, and second circuit means for connecting the output junction to one side of the high-voltage source.

Further, my preferred amplifier includes an output transistor having emitter, collector and base electrodes, a field effect transistor having source, drain and gate electrodes, the collector electrode being connected to the output junction of the amplifier and through the said second circuit means to the said one side of the high-voltage source, the emitter electrode and the drain electrode being connected to the opposite side of the high-voltage source and to the opposite side of the low-voltage source, the source electrode being connected to the base electrode, and the gate electrode being connected to the summing junction and through the first circuit means to the said one side of the low-voltage source, and third circuit means for connecting the source electrode to the said one side of the high-voltage source.

Other objects and features of the present invention will become apparent as this description progresses.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

In the drawings:

FIG. 1 is a schematic of one embodiment of my invention;
FIG. 2 is a diagrammatical illustration of a microprobe
FIG. 3 is a schematic of another embodiment of my invention; and
FIG. 4 is a schematic of my preferred low-voltage calibrated current source.

Referring particularly to FIG. 1, it will be seen that my iontophoresis device illustrated therein herein includes a low-voltage calibrated current source 10 which hereinafter sometimes will be referred to as a calibrated voltage source, and another voltage source which is illustrated as a 90-volt battery. In this description and in the claims appended hereto, I refer to a high-voltage source and a low-voltage calibrated current source. It will be appreciated that these terms "high-voltage source" and "low-voltage calibrated current source" are relative. For instance, while I have illustrated a 90-volt battery as the high-voltage source, I may use, for instance a 300-volt battery as the "high-voltage source." Further, as seen in FIG. 4, my calibrated voltage source 10 includes a 9-volt battery which is merely illustrative.

In between these voltage sources, I place an inverter amplifier which includes a field effect transistor $Q_1$ and a conventional junction transistor $Q_2$ as an output transistor. Transistor $Q_2$ is a conventional NPN-transistor having emitter, base and collector electrodes. Transistor $Q_1$ is conventional and has a source electrode S, a drain electrode D and a gate electrode electrode G. It will be appreciated that the drain electrode D of transistor $Q_1$ and the emitter electrode of transistor $Q_2$ are both connected to the negative side of the high-voltage source and the negative side of the voltage source 10. The source electrode S of transistor $Q_1$ is connected to the base electrode of transistor $Q_2$. The source electrode S is also connected through a resistor 21 to the positive side of the high-voltage source and the collector electrode of transistor $Q_2$ is connected through a resistor 22 to the positive side of the high-voltage source. The gate electrode G of the transistor $Q_1$ is connected through a resistor 20 to the positive side of the low-voltage source 10.

I show an output junction A which is connected to the collector electrode of transistor $Q_2$ and a summing junction $J_1$ which is connected to the gate electrode G of transistor $Q_1$. I also show a reference junction $J_2$ which is common to the drain electrode D, the emitter electrode of transistor $Q_2$, the negative side of the high-voltage source and the negative side of the low-voltage source. These junctions A, $J_1$ and $J_2$, will provide reference points for the following discussion.

My amplifier, therefore, can be considered as a half-operational amplifier involving an inverting input and an output which moves only in values of one polarity.

The load for my iontophoresis unit, i.e., the probe which is inserted into the biological medium, is connected between output junction A and the summing junction $J_1$. This load is represented by $R_L$. Also, for metering purposes, I show a resistor $R_X$ connected in series with the load $R_L$. I also show a voltmeter VM connected across the resistor $R_X$. The voltmeter VM is preferably a digital voltmeter used to monitor the current applied to the load.

It is important to note that my entire unit is floating and that there are no ground terminals. This is the reason for the 90-volt battery.

Referring to FIG. 2, it will be seen that I have illustrated diagrammatically a microelectrode comprising a glass capillary tube or a pipette 30, the lower end of which is drawn down to, for instance, one micron as indicated. The pipette 30 may be drawn down to a size ranging from 0.5 to 2 microns. This pipette 30 is filled with an ionic form of solution, such as an amino acid or sodium chloride. A wire, which is preferably a silver-silver chloride wire having stable contact resistance characteristics, extends downwardly into the pipette 30 as illustrated to be in contact with the solution in the pipette. The solution in the pipette 30 is a current conducting means. The lower, pointed end of the pipette 30 is inserted into a biological medium, such as the nerve cell indicated at 32. It will be appreciated that the cell 32 may have a width dimension d of, for instance, 50 to 200 microns. The load $R_L$, therefore, includes the resistance between the upper end of the wire at point A and the tissue adjacent the cell 32, this tissue being indicated at the point B.

Referring now to FIG. 3, an alternative version of my iontophoresis unit will be discussed. The circuits of FIGS. 1 and 3 differ in that transistor $Q_1$ is an N-channel field effect transistor which is operable in the depletion mode and transistor $Q_2$ is a PNP high-voltage transistor. Thus, in FIG. 3, as compared to the circuit of FIG. 1, the polarity of the voltage sources is reversed.

Further, in the circuit of FIG. 3, I prefer to use a Zener diode $D_1$ connected between the circuit emitter of transistor $Q_2$ and the positive side of the voltage sources. This Zener diode $D_1$ is used primarily for increased temperature stability and is added to raise the source to drain voltage of $Q_1$ so that it is operating in its linear range. I may also use another Zener diode $D_2$ of low leakage characteristics connected between the anode of diode $D_1$ and the gate electrode G of transistor $Q_1$ to protect transistor $Q_1$ from large transients which may appear at its gate electrode G.

It will also be noted that, in the circuitry of FIG. 3, instead of using a single resistor 20, I prefer to use a fixed-value resistor in series with an adjustable resistor for calibration purposes.

Referring to FIG. 4, it will be seen that the illustrative low-voltage, calibrated current source 10 includes a 9-volt battery connected in series with a conventional constant current circuit means 40 including a field effect transistor and an adjustable resistor $P_2$. Across this 9-volt battery and constant current circuit means 40 I connect a plurality of precision resistors. Specifically, I prefer to provide three sets of nine resistors each in series switch the resistors of each set being connected in series. Then arrange switch means for shunting certain of these resistors to provide a selected current output. In the illustrative embodiment, I show a rotary selector switch $RS_1$ associated with the first set of resistors, a rotary selector switch $RS_2$ associated with the second set of resistors and a rotary selector switch $RS_3$ associated with the third set of resistors The first switch RS 1 is arranged to provide steps of 1 nanoampere; the switch $RS_2$ is arranged to provide steps of 10 nanoamperes; and the switch $RS_3$ is arranged to provide steps of 100 nanoamperes. In the illustration of FIG. 4, the three switches $RS_1$, $RS_2$, $RS_3$ are positioned to establish a 111 nanoampere output. Thus, with these three switches, any desired current from zero nanoamperes to 900 nanoamperes can be provided.

IN FIG. 4, I show a switch $S_1$ which is the ON-OFF switch for the source 10. I also show a switch $S_2$ which may be operated to apply surges of current as desired. Switch $S_2$ may be a manually operated switch or it may be some automatically operated switching device, such as a silicon controlled rectifier or a field effect transistor, which is arranged to provide controlled periods of current output from the source 10.

The regulation regulation is accomplished by connecting the load RL between the output junction A of the amplifier and the summing junction $J_1$ or inverting input. A predetermined current is maintained by the application of a calibrated voltage source through the input resistor 20 to provide an offset current into the summing junction $J_1$.

If the reference voltage ($V_c$) of the summing junction (the potential of $J_1$ with respect to $J_2$ such that $I_c=0$) is supposedly 2 volts and the calibrated voltage is 1 volt and the input resistor is 1 megohm, then a current is caused to flow into $J_1$ which is 1,000 nanoamperes, the offset voltage being 2 minus 1 or 1 volt and the resistance being 1 megohm. This offsetting current causes $J_1$ to be slightly lowered in voltage. This lowers the gate voltage of the field effect transistor $Q_1$ toward reference $J_2$ which lowers the source S toward reference point $J_2$ which lowers the base of $Q_2$ toward the reference point $J_2$. This action turns off transistor $Q_2$ and allows point A to rise in voltage. Point A rises in voltage until the current flowing through $R_L$ is equal to the current flowing through the resistor 20 having an equal but opposite effect on the voltage of point $J_1$ which restores the gate G of the filed effect transistor $Q_1$ to its original reference voltage. The gain of these two stages is sufficient to restore point $J_2$ very nearly to 2 volts such that the current in $R_L$ is very closely equal to the offset current through resistor 20. In this case, by offset current we mean a disturbing current, i.e., a current which disturbs junction $J_1$.

The reference voltage ($V_c$) mentioned as 2 volts previously may be different for different transistors. It may be determined easily by making the input current equal to zero by disconnecting resistor 20 from gate G with any known load between the output point A and $J_1$ of the input amplifier and measuring the voltage from $J_2$ to point A. This is the gate voltage at which no current is flowing through $R_L$ because the voltage of point A equals the voltage at point $J_1$.

The iontophoretic application of a drug through a micropipette is accomplished by applying an electrical potential to an ionized solution contained in the glass capillary tube 30. This voltage applied to the micropipette causes a current to flow through it.

The drug in the pipette must be adjusted to a pH such that it is ionized so that the total charge is either positive or negative. If the charge of the molecules of the drug is positive, a positive potential must be applied to the top of the micropipette (point A) so that the ionized drug which carries the current through the micropipette moves toward the tip of the micropipette and out into the external medium. Thus the ionized drug is moved or electrically sprayed (the word iontophoresis means to spray ions) out of the micropipette an into the biological medium. The amount of drug sprayed is approximated by determining the product of the total charge flow (the product of current and time) ans a transport number describing the ration of drug molecule flow to electron flow.

My device may be used in conjunction with a micropipette or microelectrode to affect a cell in either one of two important ways. The first is by applying a drug or various ions to the cell and the second is by altering the electrical potential inside the cell.

My device is an improvement over present devices for establishing this small isolated current because it will enable the current value to be set automatically before it is desired and the current will equal to the amount indicated on the setting dial. By using previous devices, it is impossible to predict the amount of current which will flow because their control systems are not linear in the applicable current range. In previous devices, the magnitude of the current applied through the microelectrode has been determined by viewing it in an oscilloscope and then changing its value by turning a knob on the current delivering device until the value of the oscilloscope indicated that the value desired by the operator. In my device, the level of current can be established before any current application is made to the nerve cell and immediately accomplished by turning the device on. Once my unit is calibrated, further adjustments are not necessary other than dialing the desired current on the digital dials of $RS_1$, $RS_2$, $RS_3$.

The bias 9-volt battery supplies the electrical energy to the constant current circuit 40 to provide a fixed current into the precision resistor load complex. The current through this load resistor is very large in the order of 1,000 times compared to the current into the summing junction $J_1$ and, therefore, the voltage can be considered unaffected by the small current flowing into the summing junction $J_1$. The three load switches $RS_1$, $RS_2$ and $RS_3$ are arranged such that the effect of all three switches is summed. If, for instance, $RS_1$, is set at 1 nanoampere, $RS_2$ is set at 20 nanoamperes and $RS_3$ is set at 300 nanoamperes, the total effect will be that 321 nanoamperes are caused to flow through resistor 20. The function of these three switches $RS_1$, $RS_2$ and $RS_3$ then is to provide various changes from the reference voltage at $J_1$ such that if the output voltage of the calibrated reference source is equal to the reference voltage, no current will flow through resistor 20. But, if the calibrated voltage source 10 output is zero volts then the maximum current or the maximum difference will occur between its voltage and the reference point at $J_1$.

My unit is zeroed and calibrated in this manner, Switch $S_2$ is turned on. Digital switches $RS_1$, $Rs_2$ and $RS_3$ are all set at zero for maximum output voltage and a current monitor is noted or placed in series with a load $R_L$ potentiometer. $P_2$ is then adjusted until no current is flowing through the load. This occurs when the voltage at $J_3$ is caused to rise to be equal to the turn on or reference voltage ($V_c$) at $J_1$ and, thus, because there is no potential difference between these two points, no current is caused to flow into the summing junction. The device is then calibrated at some desired level of current flow of, for instance, 100 nanoamperes. To do this $RS_3$ is set so that it reads 100 nanoamperes and then current monitoring device VM in series with the load $R_L$ is noted and potentiometer $P_1$ is adjusted until exactly 100 nanoamperes are flowing through the load $R_L$. The zero setting should be rechecked again and if the readjustment is necessary, then the 100 nanoamperes calibrated should be checked again in case these two adjustments interact. If the leakage current into the transistor $Q_1$ is sufficiently low there should be no interaction between these two controls.

With these two adjustments accomplished and with switch $S_2$ off, it is possible to dial any desired current on the digital dials ($RS_1$, $RS_2$, $RS_3$) and apply it at will with $S_2$. To do this, assuming, for instance, that the charge of the molecules of the drug to be iontophoresed is negative and that point A of the constant current device shown in FIG. 3 is connected to point A of the microelectrode shown in FIG. 2 and that point B of FIG. 3 is connected to point B shown in FIG. 2, $S_2$ is turned on via some external control switch for the desired amount of time to apply the current that is indicated by the three dial settings ($RS_1$, $RS_2$, $RS_3$) through the microelectrode. The current is equal to the indicated values on the dials even if the microelectrode ($RS_L$) resistance changes within a range starting one megohm and running to values near 300 megohms. If, however the charge on the ions in the microelectrode are positive instead of negative, the regulator circuit connection would be reversed. That is, point A of the regulator of FIG. 3 would be connected to point B of FIG. 2 and point B of the regulator of FIG. 3 would be connected to point A of FIG. 2.

It may be that it is not desired electrically to spray a drug into the cell 30 to effect it, but merely to change the electrical potential inside the cell with this device. This can be accomplished merely be selecting the desired conducting solutions to be placed in the micropipette 30.

What is claimed is:

1. A unit for applying a linearly controlled current to the load, said unit comprising a high-voltage source, a low-voltage, calibrated current source, and a half-operational amplifier for connecting such a load to said sources, said amplifier including an output junction and a summing junction between which such a load can be connected, first circuit means for connecting said summing junction to one side of said low-voltage source, and second circuit means for connecting said output junction to one side of said high-voltage source, said amplifier including an output transistor, the collector electrode of which is connected to said output junction, said second circuit means including resistance means, said amplifier also including a field effect transistor, the source electrode of which is connected to the base electrode of said output transistor and the gate electrode of which is connected to said summing junction, said first circuit means including resistance means, and means for probing into a biological medium, such as a nerve cell, to apply such a current thereto, said probing means being effective, when inserted into such a medium, to provide such a load between said output junction and said summing junction.

2. The unit of claim 1 in which said low-voltage source includes means for selectively establishing the current output thereof, whereby linearly controlled step increases of current can be applied to said summing junction.

3. The unit of claim 1 in which said low-voltage source includes a battery, a constant current circuit means connected in series with said battery, a plurality of precision resistors connected in series across said battery and said constant current circuit means, and switch means for selectively shunting certain of said resistors, thereby to apply selectively variable current values to said summing junction.

4. An iontophoresis unit comprising means for probing into a biological medium, said probing means providing a resistance load, a high-voltage source, a low-voltage, calibrated current source, and an amplifier, said amplifier including an output junction and a summing junction between which said probe means is connected, first circuit means for connecting said summing junction to one side of said low-voltage source, and second circuit means for connecting said output junction to one side of said high-voltage source.

5. The unit of claim 4 in which said amplifier includes an output transistor having emitter, collector and base electrodes, a field effect transistor having source, drain and gate electrodes, said collector electrode being connected to said output junction and through said second circuit means to said one side of high-voltage source, said emitter electrode and said drain electrode ebbing connected to the opposite side of said high-voltage source and to the opposite side of said low-voltage source, said source electrode being connected to said base electrode, and said gate electrode being connected to said summing junction and through said first circuit means to said one side of said low-voltage source, and third circuit means for connecting said source electrode to the said one side of said high-voltage source.

6. The unit of claim 5 in which said output transistor in an PNP-transistor and said field effect transistor is an N-channel transistor operable in the depletion mode, and in which said one side of said high-voltage source is negative and said opposite side of said high-voltage source is positive.

* * * * *

PO-1050
(5/69)

UNITED STATES PATENT OFFICE
CERTIFICATE OF CORRECTION

Patent No. 3,618,601                    Dated November 9, 1971

Inventor(s)    Thatcher W. Richardson

It is certified that error appears in the above-identified patent and that said Letters Patent are hereby corrected as shown below:

Column 1, line 21, "ONce" should be -- Once --; line 69, delete "herein"; line 70, insert a comma after "voltage" and after "which". Column 2, line 2, insert a comma after "voltage". Column 3, line 2, delete "circuit"; line 22, "switch" should be -- with --; line 23, "Then" should be -- I then --; line 28, insert a period after "resistors"; line 44, "regulation" (first occurrence) should be -- current --; line 64, "filed" should be -- field --. Column 4, line 10, "pH" should be -- ph --; line 18, "an" should be -- and --; line 21, "ans" should be -- and --; line 31, after "will" insert -- be --; line 39, "indicated" should be -- indicates --; same line, delete "the" (first occurrence); line 65, the comma after "manner" should be a period. Column 5, line 3, after "then" insert -- the --; line 6, delete "the" (last occurrence); line 15, "of" (first occurrence) should be -- on --; line 24, "$(RS_L)$" should be -- $(R_L)$ --; line 25, after "ing" insert -- at --; line 30, the comma after "FIG" (first occurrence) should be a period; line 37, (Claim 1, line 1) "the" should be -- a --. Column 6, line 34 (Claim 5, line 5), after "to" insert -- the --; line 35 (Claim 5, line 6), after "of" insert -- said --; line 36 (Claim 5, line 7), "ebbing" should be -- being --; line 40 (Claim 5, line 11), after "to" insert -- the --; line 44 (Claim 6, line 1), "in an" should be -- is a --.

Signed and sealed this 25th day of April 1972.

(SEAL)
Attest:

EDWARD M. FLETCHER, JR.
Attesting Officer

ROBERT GOTTSCHALK
Commissioner of Patents